US005883859A

United States Patent [19]

Bentley

[11] Patent Number: 5,883,859

[45] Date of Patent: Mar. 16, 1999

[54] ALARM CLOCK HOUSING WITH LOCKABLE KEYPAD ENCLOSURE

[76] Inventor: Dawn Bentley, 1711 Chapel Tree Cir., Apt. H., Brandon, Fla. 33511

[21] Appl. No.: 989,102

[22] Filed: Dec. 11, 1997

[51] Int. Cl.[6] .......................... G04B 47/00; G04B 23/02; H04B 1/16

[52] U.S. Cl. .......................... 368/10; 368/73; 455/181.1; 455/344

[58] Field of Search .......................... 368/10, 41–43, 368/47, 72–74, 250, 257; 455/140, 141, 171.1, 181.1, 231.1, 344

[56] References Cited

U.S. PATENT DOCUMENTS

| | | | |
|---|---|---|---|
| 4,152,768 | 5/1979 | Kuriya | 364/705 |
| 4,301,524 | 11/1981 | Koepp et al. | 368/261 |
| 4,712,923 | 12/1987 | Martin | 368/10 |
| 4,715,010 | 12/1987 | Inoue et al. | 364/705 |
| 4,868,800 | 9/1989 | Arber | 368/29 |
| 5,199,009 | 3/1993 | Svast | 368/240 |
| 5,365,494 | 11/1994 | Linch | 368/10 |

*Primary Examiner*—Vit Miska
*Attorney, Agent, or Firm*—Joseph N. Breaux

[57] ABSTRACT

An alarm clock housing with lockable keypad enclosure that includes a time/alarm entry keypad. The lockable keypad enclosure is lockable with an enclosure cover combination locking mechanism that includes a receiving tube cavity formed into the molded alarm clock housing member, a locking solenoid with a normally extended retractable locking bolt, three rotary combination wheels each having a shaft receiving aperture and a shaft conductor contact, a split conductor wheel shaft including three nonconducting gaps along the length thereof, and left and right rotary shaft contacts each with a conducting lead wire. The normally extended retractable locking bolt is sized and positioned to be extendable into the locking bolt receiving tube when the pivoting enclosure cover is pivoted into the closed position.

16 Claims, 2 Drawing Sheets

ALARM CLOCK HOUSING WITH LOCKABLE KEYPAD ENCLOSURE

TECHNICAL FIELD

The present invention relates to alarm clocks and the like and more particularly to an alarm clock housing with a lockable keypad enclosure that includes a molded alarm clock housing member; a time display window; an alarm on/off switch; a time/alarm set keypad positioned within a keypad enclosure formed into the molded alarm clock housing member; a pivoting enclosure cover pivotable into a closed position blocking access to the time/alarm set keypad and having a locking bolt receiving tube; an enclosure cover combination locking mechanism including a receiving tube cavity formed into the molded alarm clock housing member, a locking solenoid with a normally extended retractable locking bolt, three rotary combination wheels each having a shaft receiving aperture and a shaft conductor contact, a split conductor wheel shaft including three nonconducting gaps along the length thereof, and left and right rotary shaft contacts each with a conducting lead wire; the split conductor wheel shaft being inserted through the shaft receiving aperture of each of the three rotary combination wheels; each left and right rotary shaft contact being in sliding electrical contact with a circumferential conducting contact of the split conductor wheel shaft; the split conductor wheel shaft of the enclosure cover combination locking mechanism being wired in series with the locking solenoid.

BACKGROUND ART

Many individuals find it difficult to set the time and/or the desired alarm time on electronic alarm clocks. It would be a benefit to these individuals to have an alarm clock housing that included a time/alarm entry keypad that was interfaceable with an alarm clock circuit through which the time and alarm times could be input to the alarm clock circuit. Because it can be desirable to prevent unauthorized people from altering the time and or alarm time of an alarm clock it would also be desirable to have an alarm clock housing that included a lockable keypad enclosure. Because keys can be lost or misplaced, it would be a further benefit to have an alarm clock housing that included a lockable keypad enclosure that was lockable with a combination locking mechanism.

GENERAL SUMMARY DISCUSSION OF INVENTION

It is thus an object of the invention to provide an alarm clock housing with lockable keypad enclosure that includes a time/alarm entry keypad.

It is a further object of the invention to provide an alarm clock housing with lockable keypad enclosure that is lockable with a combination locking mechanism.

It is a still further object of the invention to provide an alarm clock housing with lockable keypad enclosure that includes a molded alarm clock housing member; a time display window; an alarm on/off switch; a time/alarm set keypad positioned within a keypad enclosure formed into the molded alarm clock housing member; a pivoting enclosure cover that is pivotable into a closed position blocking access to the time/alarm set keypad and having a locking bolt receiving tube; an enclosure cover combination locking mechanism including a receiving tube cavity formed into the molded alarm clock housing member, a locking solenoid with a normally extended retractable locking bolt, three rotary combination wheels each having a shaft receiving aperture and a shaft conductor contact, a split conductor wheel shaft including three nonconducting gaps along the length thereof, and left and right rotary shaft contacts each with a conducting lead wire; the normally extended retractable locking bolt being sized and positioned to be extendable into the locking bolt receiving tube when the pivoting enclosure cover is pivoted into the closed position; the split conductor wheel shaft being inserted through the shaft receiving aperture of each of the three rotary combination wheels; each left and right rotary shaft contact being in sliding electrical contact with a circumferential conducting contact of the split conductor wheel shaft; the split conductor wheel shaft of the enclosure cover combination locking mechanism being wired in series with the locking solenoid.

It is a still further object of the invention to provide an alarm clock housing with lockable keypad enclosure that accomplishes some or all of the above objects in combination.

Accordingly, an alarm clock housing with lockable keypad enclosure is provided. The alarm clock housing with lockable keypad enclosure includes a molded alarm clock housing member; a time display window; an alarm on/off switch; a time/alarm set keypad positioned within a keypad enclosure formed into the molded alarm clock housing member; a pivoting enclosure cover that is pivotable into a closed position blocking access to the time/alarm set keypad and having a locking bolt receiving tube; an enclosure cover combination locking mechanism including a receiving tube cavity formed into the molded alarm clock housing member, a locking solenoid with a normally extended retractable locking bolt, three rotary combination wheels each having a shaft receiving aperture and a shaft conductor contact, a split conductor wheel shaft including three nonconducting gaps along the length thereof, and left and right rotary shaft contacts each with a conducting lead wire; the normally extended retractable locking bolt being sized and positioned to be extendable into the locking bolt receiving tube when the pivoting enclosure cover is pivoted into the closed position; the split conductor wheel shaft being inserted through the shaft receiving aperture of each of the three rotary combination wheels; each left and right rotary shaft contact being in sliding electrical contact with a circumferential conducting contact of the split conductor wheel shaft; the split conductor wheel shaft of the enclosure cover combination locking mechanism being wired in series with the locking solenoid.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
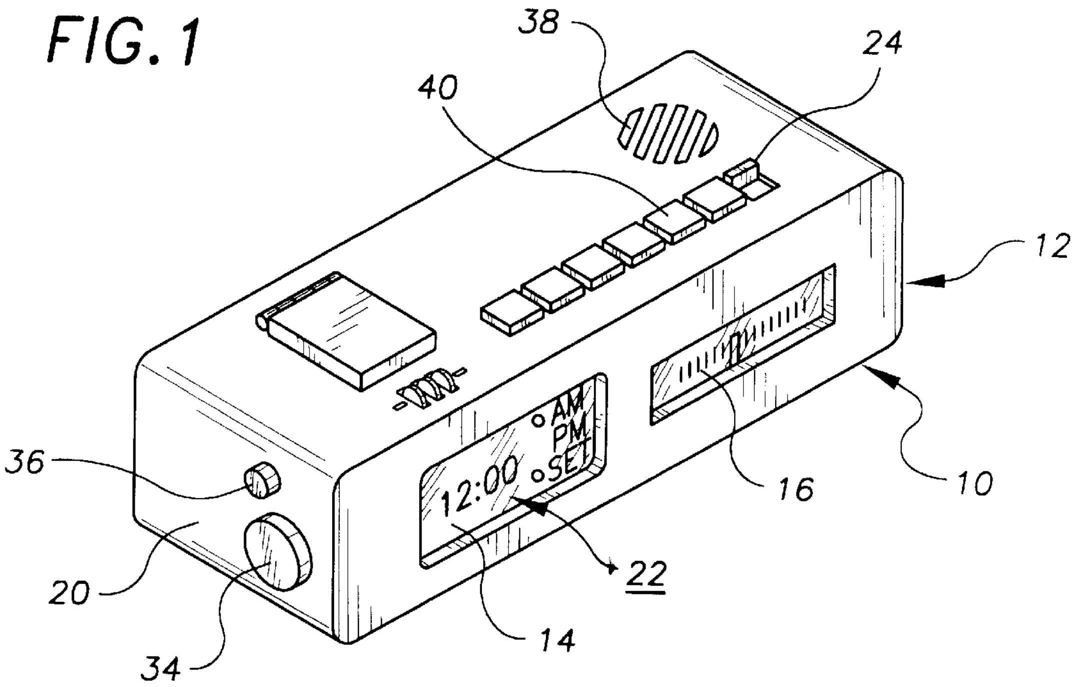
FIG. 1 is a perspective view of an exemplary embodiment of a radio alarm clock that includes an exemplary embodiment of the alarm clock housing with lockable keypad enclosure of the present invention showing the molded alarm clock housing member; the time display; the alarm on/off switch; the time/alarm set keypad positioned within the keypad enclosure and the enclosure cover in the closed position; the enclosure cover combination locking mechanism; the radio tuning knob; the volume control; the speaker grating; and the snooze button.

FIG. 1 shows a representative radio alarm clock, generally designated 10, that includes an exemplary embodiment of the alarm clock housing with lockable keypad enclosure of the present invention, generally designated 12. In this embodiment, representative alarm clock 10 includes a conventional alarm clock circuit, an illuminated liquid crystal display 14, a conventional radio receiver circuit, a conventional radio tuner dial display 16, a rotatable volume control input shaft and a rotatable tuning dial input shaft. Clock housing with lockable keypad enclosure 12 includes a molded plastic alarm clock housing member 20; a rectangular time display window 22; a two position alarm on/off switch 24; with reference now to FIG. 2, a time/alarm set keypad, generally designated 26, positioned within a keypad enclosure 28; a pivoting enclosure cover 30; an enclosure cover combination locking mechanism, generally designated 32; referring back to FIG. 1, a radio tuning knob 34; a volume control knob 36; a speaker grating 38; and a snooze button 40.

With reference again to FIG. 2, time/alarm set keypad 26 includes ten time entry keys 46 that are numbered from zero to nine; an a.m./p.m. designation key 48; and a set key 50. In this embodiment transparent enclosure cover 30 is molded of transparent plastic and includes a locking bolt receiving tube 52 at the far end 54 thereof. Enclosure cover 30 pivots into a closed position wherein locking bolt receiving tube 52 is seated within a receiving tube cavity 56 that is formed into molded alarm clock housing member 12. A locking solenoid 58 (shown schematically in FIG. 4) having a retractable locking bolt 60 (see also FIG. 4) extends through a defining sidewall of receiving tube cavity 56 and into locking bolt receiving tube 52 when it is positioned within receiving tube cavity 56.

Figure 2:
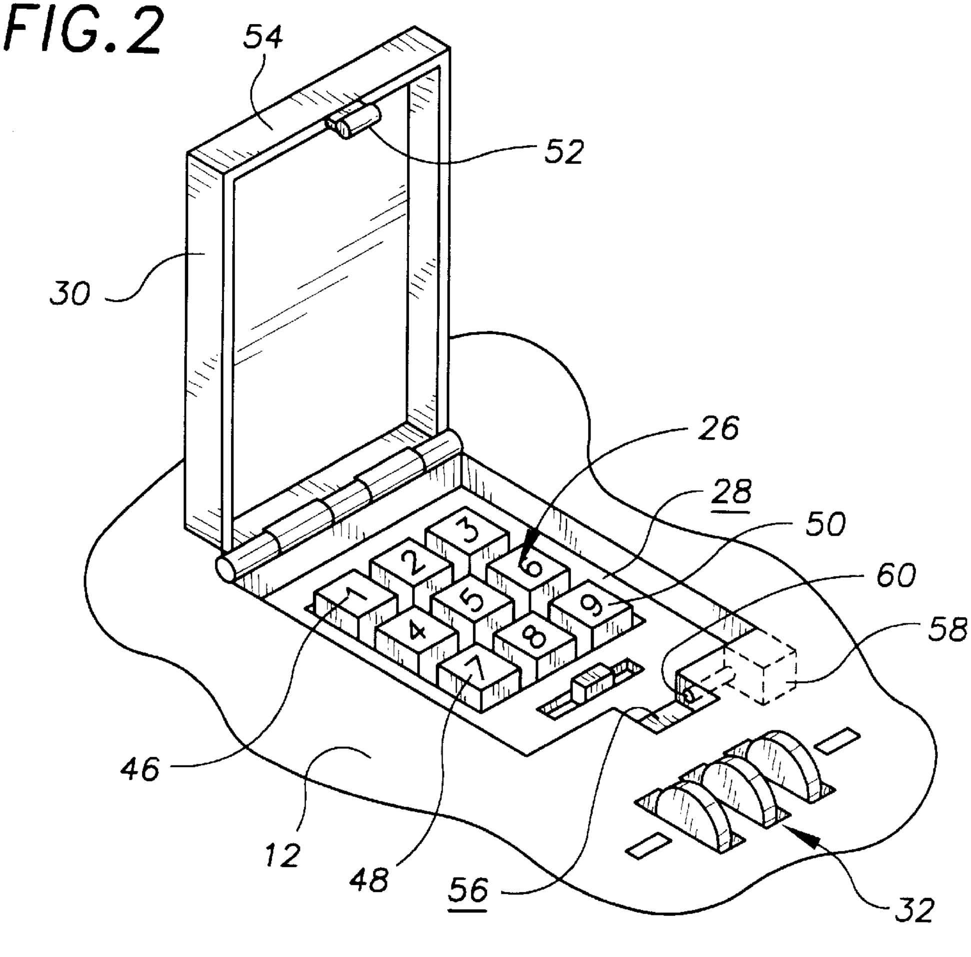
FIG. 2 is a detail perspective view showing the time/alarm set keypad positioned within the keypad enclosure including the ten time entry keys, the a.m./p.m. designation key and the set key; the transparent enclosure cover in the open position showing the locking bolt receiving tube; the receiving tube cavity formed into the molded alarm clock housing member; the locking solenoid with the retractable locking bolt in the retracted position; the three rotary combination wheels of the enclosure cover combination locking mechanism; and the three position keypad mode select switch.
Figure 3:
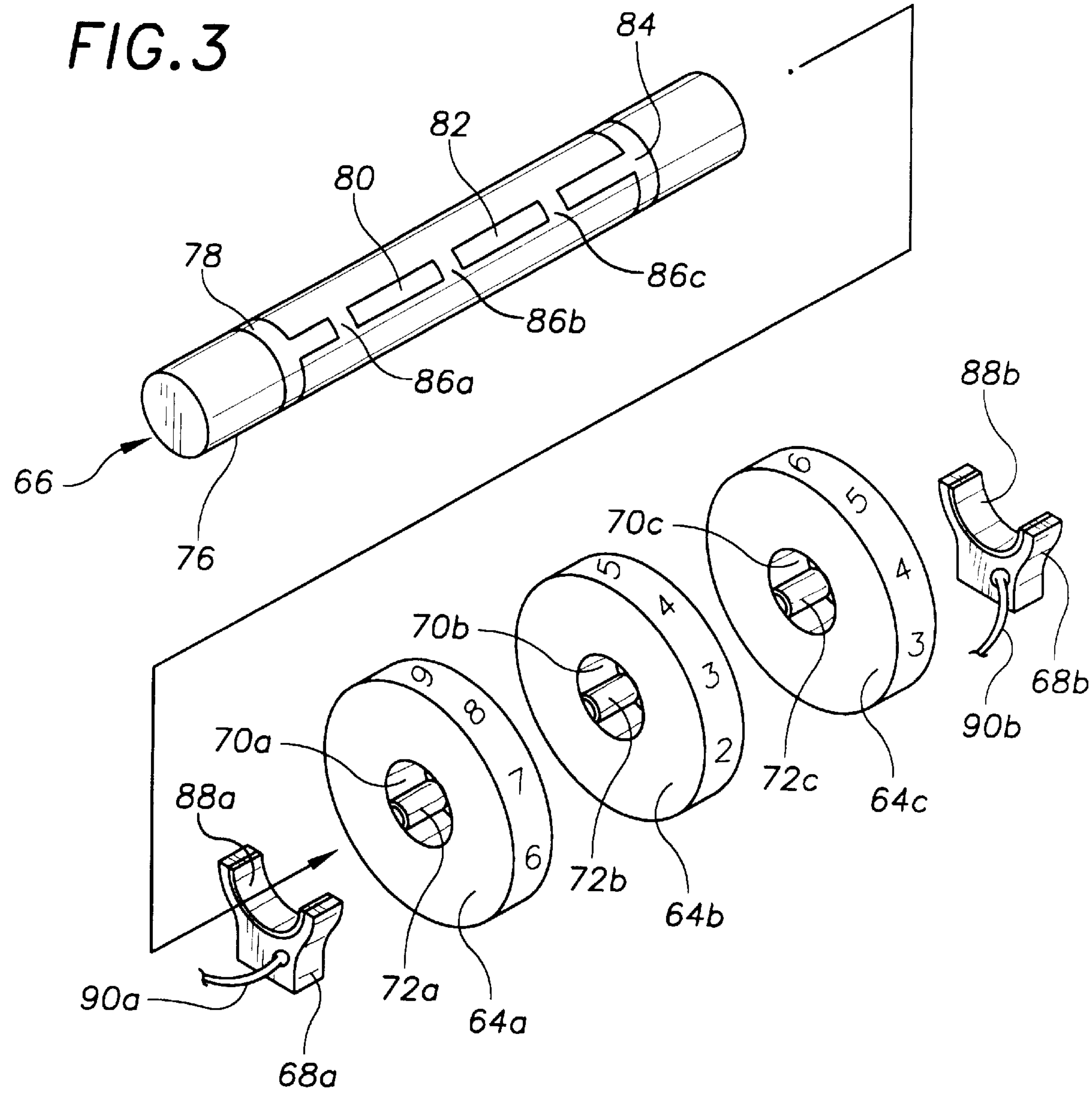
FIG. 3 is an exploded perspective view of the enclosure cover combination locking mechanism including the split conductor wheel shaft; the left and right rotary shaft contacts each with a conducting lead wire; and the three rotary combination wheels each with a shaft receiving aperture and a shaft conductor contact.

With reference to FIG. 3, actuation of locking solenoid 58 (FIGS. 2 and 4) is controlled by manipulating three rotary combination wheels 64*a–c* that are rotatably mounted onto a split conductor wheel shaft 66 that is supported at either end by left and right rotary shaft contacts 68*a*,68*b*. Each rotary combination wheel 64*a–c* is formed from an electrically non-conducting plastic and includes a shaft receiving aperture 70*a–c* and a shaft conductor contact 72*a–c*. Split conductor wheel shaft 66 includes a rod shaped shaft member 76 constructed from an electrically non-conducting plastic, a left circumferential contact 78, a first contact strip 80, a second contact strip 82, and a right circumferential contact 84. Left and right circumferential contacts 78 and 84 are formed around the entire circumference of shaft member 76. Three non-conducting gaps 86*a–c* are formed respectively between left circumferential contact 78 and a first contact strip 80; first contact strip 80 and second contact strip 82; and second contact strip 82, and a right circumferential contact 84.

Left and right rotary shaft contacts 68*a*,68*b* each include a curved shaft gripping electrical contact 88*a*,88*b* that is sized and shaped to slidingly grip a left or a right circumferential contact 78,84 and also includes a conducting wire 90*a*,90*b*.

Figure 4:
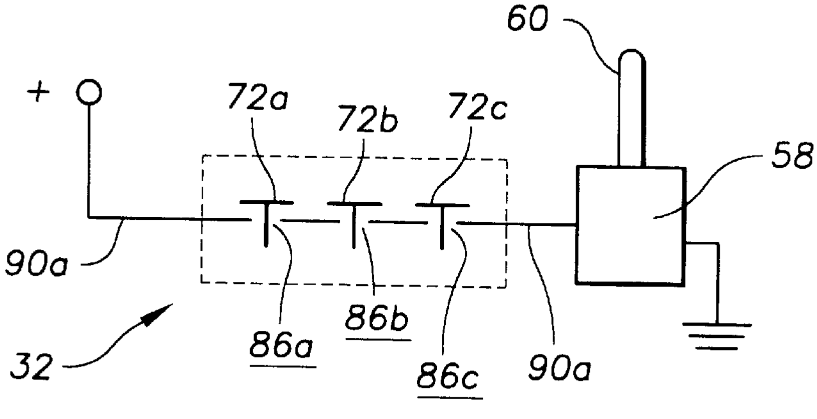
FIG. 4 is a schematic diagram showing the enclosure cover combination locking mechanism including the positive electrical power connection; the three in series switches formed by the split conductor wheel shaft, the left and right rotary shaft contacts and the three rotary combination wheels of FIG. 3; the locking solenoid with the normally extended retractable locking bolt; and the negative electrical power terminal connection.

With reference to FIG. 4, in use, the shaft conductor contacts 72*a–c* act as switch contractors to provide a conducting path across non-conducting gaps 86*a–c* when each rotary combination wheel 64*a–c* (FIG. 3) is positioned into one of ten rotational positions corresponding to one digit of a three digit numerical combination. When all three non-conducting gaps 86*a–c* are bridged by positioning the three rotary combination wheels 64*a–c* in the correct positions, locking solenoid 58 is actuated retracting retractable locking bolt 60 and releasing enclosure cover 30 (FIG. 2).

It can be seen from the preceding description that an alarm clock housing with lockable keypad enclosure has been provided that includes a time/alarm entry keypad; that is lockable with a combination locking mechanism; and that includes a molded alarm clock housing member; a time display window; an alarm on/off switch; a time/alarm set keypad positioned within a keypad enclosure formed into the molded alarm clock housing member; a pivoting enclosure cover that is pivotable into a closed position blocking access to the time/alarm set keypad and having a locking bolt receiving tube; an enclosure cover combination locking mechanism including a receiving tube cavity formed into the molded alarm clock housing member, a locking solenoid with a normally extended retractable locking bolt, three rotary combination wheels each having a shaft receiving aperture and a shaft conductor contact, a split conductor wheel shaft including three nonconducting gaps along the length thereof, and left and right rotary shaft contacts each with a conducting lead wire; the normally extended retractable locking bolt being sized and positioned to be extendable into the locking bolt receiving tube when the pivoting enclosure cover is pivoted into the closed position; the split conductor wheel shaft being inserted through the shaft receiving aperture of each of the three rotary combination wheels; each left and right rotary shaft contact being in sliding electrical contact with a circumferential conducting contact of the split conductor wheel shaft; the split conductor wheel shaft of the enclosure cover combination locking mechanism being wired in series with the locking solenoid.

It is noted that the embodiment of the alarm clock housing with lockable keypad enclosure described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An alarm clock housing with lockable keypad enclosure comprising:

a molded alarm clock housing member;

a time display window;

an alarm on/off switch extending outwardly from the alarm clock housing member;

a time/alarm set keypad positioned within a keypad enclosure formed into said molded alarm clock housing member;

a pivoting enclosure cover that is pivotable into a closed position blocking access to said time/alarm set keypad and having a locking bolt receiving tube;

an enclosure cover combination locking mechanism including a receiving tube cavity formed into said molded alarm clock housing member, a locking solenoid with a normally extended retractable locking bolt, three rotary combination wheels each having a shaft receiving aperture and a shaft conductor contact, a split conductor wheel shaft including three nonconducting gaps along a length thereof, and left and right rotary shaft contacts each with a conducting lead wire;

said normally extended retractable locking bolt being sized and positioned to be extendable into said locking bolt receiving tube when said pivoting enclosure cover is pivoted into said closed position;

said split conductor wheel shaft being inserted through said shaft receiving aperture of each of said three rotary combination wheels;

each left and right rotary shaft contact being in sliding electrical contact with a circumferential conducting contact of said split conductor wheel shaft;

said split conductor wheel shaft of said enclosure cover combination locking mechanism being wired in series with said locking solenoid.

2. The alarm clock housing with lockable keypad enclosure of claim 1, wherein:

said time display window is rectangular shaped.

3. The alarm clock housing with lockable keypad enclosure of claim 1, wherein:

said retractable locking bolt is extendable through a defining sidewall of said receiving tube cavity and into said locking bolt receiving tube when said locking bolt receiving tube is positioned within said receiving tube cavity.

4. The alarm clock housing with lockable keypad enclosure of claim 1 wherein:

said left and right rotary shaft contacts each include a curved shaft gripping electrical contact that is sized and shaped to slidingly grip a left or a right circumferential contact formed on said split conductor wheel shaft.

5. The alarm clock housing with lockable keypad enclosure of claim 1 wherein:

each rotary combination wheel is formed from an electrically non-conducting plastic; and said split conductor wheel shaft includes a rod shaped shaft member constructed from an electrically non-conducting plastic, a left circumferential contact, a first contact strip, a second contact strip, and a right circumferential contact.

6. The alarm clock housing with lockable keypad enclosure of claim 2, wherein:

said retractable locking bolt is extendable through a defining sidewall of said receiving tube cavity and into said locking bolt receiving tube when said locking bolt receiving tube is positioned within said receiving tube cavity.

7. The alarm clock housing with lockable keypad enclosure of claim 2 wherein:

said left and right rotary shaft contacts each include a curved shaft gripping electrical contact that is sized and shaped to slidingly grip a left or a right circumferential contact formed on said split conductor wheel shaft.

8. The alarm clock housing with lockable keypad enclosure of claim 2 wherein:

each rotary combination wheel is formed from an electrically non-conducting plastic; and said split conductor wheel shaft includes a rod shaped shaft member constructed from an electrically non-conducting plastic, a left circumferential contact, a first contact strip, a second contact strip, and a right circumferential contact.

9. The alarm clock housing with lockable keypad enclosure of claim 6 wherein:

said left and right rotary shaft contacts each include a curved shaft gripping electrical contact that is sized and shaped to slidingly grip a left or a right circumferential contact formed on said split conductor wheel shaft.

10. The alarm clock housing with lockable keypad enclosure of claim 6 wherein:

each rotary combination wheel is formed from an electrically non-conducting plastic; and said split conductor wheel shaft includes a rod shaped shaft member constructed from an electrically non-conducting plastic, a left circumferential contact, a first contact strip, a second contact strip, and a right circumferential contact.

11. The alarm clock housing with lockable keypad enclosure of claim 9 wherein:

each rotary combination wheel is formed from an electrically non-conducting plastic; and said split conductor wheel shaft includes a rod shaped shaft member constructed from an electrically non-conducting plastic, a left circumferential contact, a first contact strip, a second contact strip, and a right circumferential contact.

12. The alarm clock housing with lockable keypad enclosure of claim 7 wherein:

each rotary combination wheel is formed from an electrically non-conducting plastic; and said split conductor wheel shaft includes a rod shaped shaft member constructed from an electrically non-conducting plastic, a left circumferential contact, a first contact strip, a second contact strip, and a right circumferential contact.

13. The alarm clock housing with lockable keypad enclosure of claim 3 wherein:

said left and right rotary shaft contacts each include a curved shaft gripping electrical contact that is sized and shaped to slidingly grip a left or a right circumferential contact formed on said split conductor wheel shaft.

14. The alarm clock housing with lockable keypad enclosure of claim 3 wherein:

each rotary combination wheel is formed from an electrically non-conducting plastic; and said split conductor wheel shaft includes a rod shaped shaft member constructed from an electrically non-conducting plastic, a left circumferential contact, a first contact strip, a second contact strip, and a right circumferential contact.

15. The alarm clock housing with lockable keypad enclosure of claim 13 wherein:

each rotary combination wheel is formed from an electrically non-conducting plastic; and said split conductor wheel shaft includes a rod shaped shaft member constructed from an electrically non-conducting plastic, a left circumferential contact, a first contact strip, a second contact strip, and a right circumferential contact.

16. The alarm clock housing with lockable keypad enclosure of claim 4 wherein:

each rotary combination wheel is formed from an electrically non-conducting plastic; and said split conductor wheel shaft includes a rod shaped shaft member constructed from an electrically non-conducting plastic, a left circumferential contact, a first contact strip, a second contact strip, and a right circumferential contact.

* * * * *